US009467678B2

(12) United States Patent
Wang (10) Patent No.: US 9,467,678 B2
(45) Date of Patent: Oct. 11, 2016

(54) IMAGE SYNCHRONIZATION METHOD AND SYSTEM THEREOF

(71) Applicant: ALTEK SEMICONDUCTOR CORPORATION, Hsinchu (TW)

(72) Inventor: Chun-Chang Wang, Hsinchu (TW)

(73) Assignee: ALTEK SEMICONDUCTOR CORPORATION, Hsinchu (TW)

( * ) Notice: Subject to any disclaimer, the term of this patent is extended or adjusted under 35 U.S.C. 154(b) by 214 days.

(21) Appl. No.: 14/501,785

(22) Filed: Sep. 30, 2014

(65) Prior Publication Data

US 2016/0057402 A1 Feb. 25, 2016

(30) Foreign Application Priority Data

Aug. 20, 2014 (TW) .............................. 103128523 A (51) Int. Cl.
 H04N 7/18 (2006.01)
 H04N 13/00 (2006.01)
 H04N 13/02 (2006.01)
(52) U.S. Cl.
 CPC ........ H04N 13/004 (2013.01); H04N 13/0007 (2013.01); H04N 13/0051 (2013.01); H04N 13/0239 (2013.01)

(58) Field of Classification Search
 CPC .......................... G01B 11/0022; G01B 11/024
 USPC ...................................... 348/42–60, 135–142
 See application file for complete search history.

(56) References Cited

U.S. PATENT DOCUMENTS 6,763,071 B1 * 7/2004 Maeda .................. H04N 5/913
 348/465

* cited by examiner

Primary Examiner — Andy Rao
(74) Attorney, Agent, or Firm — Bacon & Thomas, PLLC (57) ABSTRACT

Disclosure is an image synchronization method and system thereof being applied to a first image detection unit and a second image detection unit. The system comprises a monitoring unit, an extension interval generation unit and a control unit. The monitoring unit monitors the first image detection unit and the second image detection unit. When a time difference between output time of second image data and output time of first image data is larger than or equal to a postponed time threshold, a synchronization signal is transmitted by the monitoring unit. The extension interval generation unit bases the time difference and the rate of outputting the first image to generate an extension interval. When receiving the synchronization signal, the control unit adjusts the rate of outputting the first image by controlling the first image detection unit. Therefore, the first image data and the second image data could be synchronized.

10 Claims, 7 Drawing Sheets

IMAGE SYNCHRONIZATION METHOD AND SYSTEM THEREOF

CROSS-REFERENCE TO RELATED APPLICATION

This application claims the benefit of Taiwan Patent Application No. 103128523, filed on Aug. 20, 2014, in the Taiwan Intellectual Property Office, the disclosure of which is incorporated herein in its entirety by reference.

BACKGROUND OF THE INVENTION

1. Field of the Invention

The following description relates to an image synchronization method and system thereof, in particular with respect to an image synchronization method and system thereof which are conducted aiming between two image detection units.

2. Description of the Related Art

In three-dimension application, generally, it can use at least two image sensors to capture depth of field information of a scene, and combine the image data obtained from the at least two image sensors and then process it to infer a distance information to build a three-dimension graphic. And the application is commonly shown in the smart phone embedded with two image sensors or two distributed image sensors, and the three-dimension graphic is thereby established.

Combining each of the image information obtained from at least two image sensors usually involves in executing image frame synchronization; however, even though two image sensors are made of the same manufacturing process, speed of outputting image frame thereof may also have a very tiny difference. For example, when two image sensors all indicate that 30 image frames are output per second, in other words, the output time of the both image frames is namely 33.33 . . . milliseconds; but the first image sensor may only be accurate at tenth decimal place, and the second image sensor is accurate at the twelfth decimal place; after a period of keeping using the two image sensors to capture image of a scene, the output time between the two image sensors may have negative effect upon the to-be-built three-dimension graphic or inference of distance information.

Therefore, how to synchronize information from a plurality of image sensors and effectively process the information to decrease the cost of image processing and complexity thereof is in an urgent need.

SUMMARY OF THE INVENTION

In view of the preceding technical problem, purpose of the present disclosure is to effectively synchronize images generated by plural image sensors.

In view of the preceding technical problem, purpose of the present disclosure is to decrease the cost of image processing and complexity thereof while synchronizing plural image sensors.

According to the preceding purposes, the present disclosure provides an image synchronization method applied to a first image detection unit and a second image detection unit, the first image detection unit keeping outputting a plurality of first image data, and each of the plurality of first image data including a first start of frame and a first image content frame; the second image detection unit keeping outputting a plurality of image data, and each of the plurality of second image data including a second start of frame and a second image content frame, wherein image lengths of the first start of frame and the first image content frame may be respectively equal to image lengths of the second start of frame and the second image content frame, a first image output speed V1 of the first image detection unit may be higher than a second image output speed V2 of the second image detection unit, and the image synchronization method including: (a) when a time difference between an output time of the second start of frame of the $j^{th}$ second image data and an output time of the first start of frame of the $i^{th}$ first image data being larger than a postponed time threshold, a control unit controlling the first image detection unit from the $(i+1)^{th}$ first image data adding an extension interval to the first image content frame to increase the first image content frame as a first image content extension interval and enabling the first image output speed decreasing from V1 to V3 such that the output time of the second start of frame of the $(j+2)^{th}$ second image data may be equal to the output time of the first start of frame of the $(i+2)^{th}$ first image data; and (b) the control unit controlling the first image detection unit from the $(i+3)^{th}$ first image data to remove the extension interval of the first image content extension interval such that the output times of the first start of frame of the $(i+3)^{th}$ first image data and the first image content frame may be respectively equal to the output times of the second start of frame of the $(j+3)^{th}$ second image data and the second image content frame, and the first image output speed being restored to V1.

Preferably, size of the extension interval may be a product of the time difference and the first image output speed.

Preferably, the postponed time threshold may be equal to a sum of a cycle of a plurality of scanning lines.

Preferably, the postponed time threshold may be equal to a multiple of a cycle of each of the plurality of scanning lines.

Preferably, the first image detection unit and the second image detection unit may be arranged on an electronic device or diverse electronic devices.

Preferably, the steps of (a) and (b) may be executed repeatedly.

According to the aforementioned in purpose, the present disclosure further provides an image synchronization system applied to a first image detection unit and a second image detection unit, the first image detection unit keeping outputting a plurality of first image data, and each of the plurality of first image data including a first start of frame and a first image content frame; the second image detection unit keeping outputting a plurality of image data, and each of the plurality of second image data including a second start of frame and a second image content frame, wherein image lengths of the first start of frame and the first image content frame may be respectively equal to image lengths of the second start of frame and the second image content frame, a first image output speed V1 of the first image detection unit may be higher than a second image output speed V2 of the second image detection unit, and the image synchronization system including: a monitoring unit used to monitor the first image detection unit and the second image detection unit, and when a time difference between an output time of the second start of frame of the $j^{th}$ second image data and an output time of the first start of frame of the $i^{th}$ first image data being larger than or equal to a postponed time threshold, transmitting a synchronization signal; an extension interval generation unit used to generate an extension interval according to the time difference and the first image output speed; and a control unit used to control the extension interval generation unit to generate the extension interval when receiving the synchronization signal, and the control unit from the $(i+1)^{th}$ first image data adding an extension interval to the first image content frame to increase the first image content frame as a first image content extension interval and to decrease the first image output speed from V1 to V3 such that the output time of the second start of frame of the $(j+2)^{th}$ second image data may be equal to the output time of the first start of frame of the $(i+2)^{th}$ first image data, and from the first image data, the control unit controlling the first image detection unit to remove the extension interval of the first image content extension interval such that the output times of the first start of frame of the first image data and the first image content frame may be respectively equal to the output times of the second start of frame of the second image data and the second image content frame, and the first image output speed being restored to V1.

Preferably, size of the extension interval may be a product of the time difference and the first image output speed.

Preferably, the postponed time threshold may be equal to a sum of a cycle of a plurality of scanning lines.

Preferably, the first image detection unit and the second image detection unit may be arranged on an electronic device or diverse electronic devices.

BRIEF DESCRIPTION OF THE DRAWINGS

Hereinafter, embodiments of the present invention will be described in detail with reference to the accompanying drawings so that those skilled in the art to which the present invention pertains can realize the present invention, wherein.

DETAILED DESCRIPTION OF THE PREFERRED EMBODIMENTS

Hereinafter, embodiments of the present invention will be described in detail with reference to the accompanying drawings so that those skilled in the art to which the present invention pertains can realize the present invention. As those skilled in the art would realize, the described embodiments may be modified in various different ways, all without departing from the spirit or scope of the present invention.

The exemplary embodiments of the present invention will be understood more fully from the detailed description given below and from the accompanying drawings of various embodiments of the invention, which, however, should not be taken to limit the invention to the specific embodiments, but are for explanation and understanding only.

Figure 1:
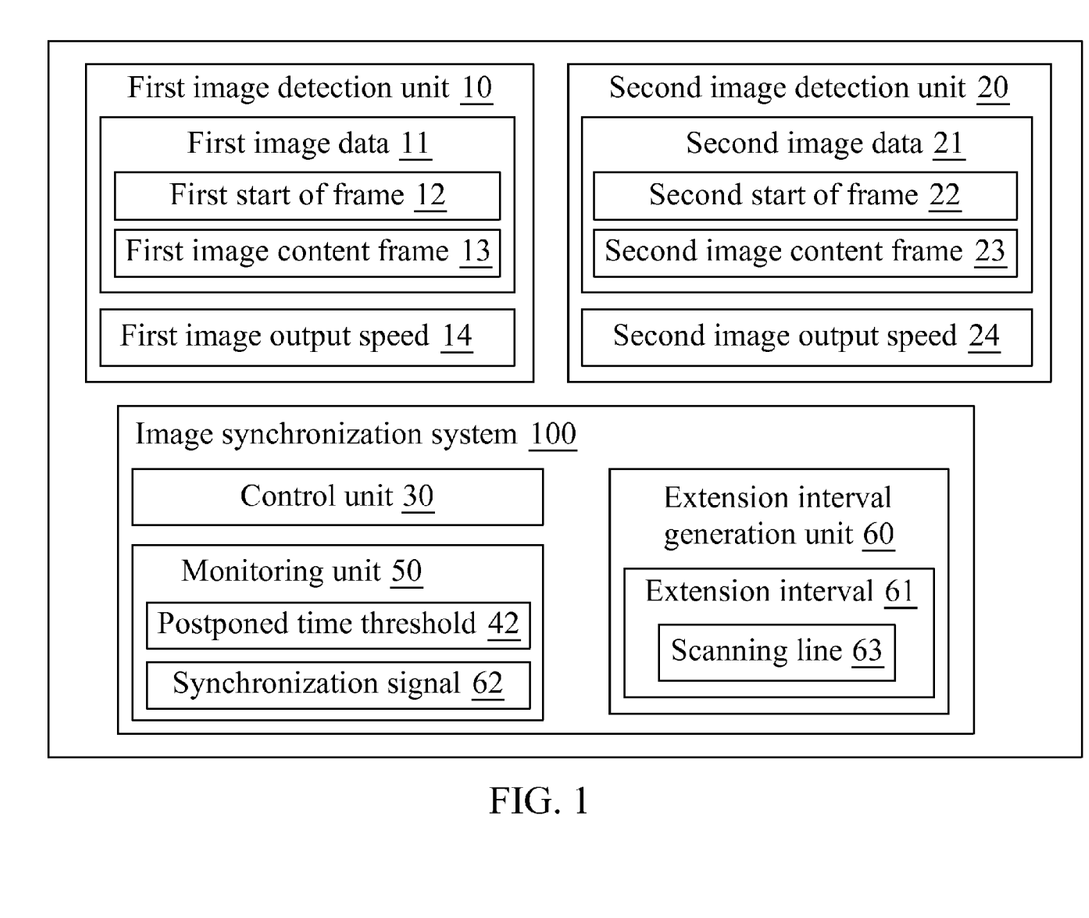
FIG. 1 is a block diagram of an image synchronization system according to the resent invention.

Please refer to FIG. 1 which is a block diagram of an image synchronization system according to the resent invention. An image synchronization system 100 shown in the FIG. 1 is applied to a first image detection unit 10 and a second image detection unit 20, the first image detection unit 10 and the second image detection unit 20 can be a lens. The first image detection unit 10 keeps outputting a plurality of first image data 11, and each of the first image data 11 includes a first start of frame 12 and a first image content frame 13.

The second image detection unit 20, which is the same as the first image detection unit 10, keeps outputting a plurality of second image data 21, and each of the second image data 21 has a second start of frame 22 and a second image content frame 23. Wherein the first image detection unit 10 and the second image detection unit 20 are arranged on an electronic device or diverse electronic devices.

Image lengths of the first start of frame 12 and the first image content frame 13 are respectively equal to image lengths of the second start of frame 22 and the second image content frame 23; a first image output speed 14 (V1) of the first image detection unit 10 is close to and slightly higher than a second image output speed 24 (V2) of the second image detection unit 20.

In the embodiment, the first image detection unit 10 and the second image detection unit 20 capture image to an object simultaneously to respectively generate the first image data 11 and the second image data 21. The first image data 11 and the second image data 21 are used to build a three-dimension graphic or to measure the depth of field information of the object.

The image synchronization system 100 includes a monitoring unit 50, an extension interval generation unit 60 and a control unit 30, and the image synchronization system 100 is electrically connected to the first image detection unit 10 and the second image detection unit 20. The monitoring unit 50 is used to monitor the first image detection unit 10 and the second image detection unit 20 to determine whether the first image detection unit 10 and the second image detection unit 20 are need to be synchronized. The determined method is describes as follows.

When a time difference (not shown in FIGS.) between an output time of the second start of frame 22 of the $j^{th}$ second image data 21 and an output time of the first start of frame 12 of the $i^{th}$ first image data 11 is larger than or equal to a postponed time threshold 42, a synchronization signal 62 is transmitted to the control unit 30 to execute the follow-up synchronization processing.

The extension interval generation unit 60 is used to generate an extension interval 61 according to the time difference and the first image output speed 14, wherein size of the extension interval 61 is a product of the time difference and the first image output speed 14.

When the control unit 30 receives the synchronization signal 62, the control unit 30 controls the extension interval generation unit 60 to generate the extension interval 61, and from the $(i+1)^{th}$ first image data 11, the control unit 30 adds the extension interval 61 to the first image content frame 13 to increase the first image content frame 13 as a first image content extension interval (not shown in FIGS.) and enables the first image output speed 14 decreasing from V1 to V3 such that the output time of the second start of frame 22 of the $(j+2)^{th}$ second image data 21 is equal to the output time of the first start of frame 12 of the $(i+2)^{th}$ first image data 11.

And from the $(i+3)^{th}$ first image data 11, the control unit 30 further controls the first image detection unit 10 to remove the extension interval 61 of the first image content extension interval such that the output times of the first start of frame 12 of the first image data 11 and the first image content frame 13 are respectively equal to the output times of the second start of frame 22 of the second image data 21 and the second image content frame 23, and the first image output speed 14 is restored to V1.

Please refer to FIG. 2A to FIG. 2E together which are the first to the fifth schematic diagrams of an image synchronization system according to the resent invention, and they are the schematic diagrams which respectively demonstrate that the first image detection unit 10 and the second image detection unit 20 keep outputting the first image data 11 and the second image data 21. Each point on the horizontal direction, which uses millisecond as its unit, indicates time points for observing the first image data 11 and the second image data 21. Wherein each of the first image data 11 includes the first start of frame 12 (SOF) and the first image content frame 13, each of the second image data 21 includes the second start of frame 22 (SOF) and the second image content frame 23, and the postponed time threshold 42 is X millisecond.

Figure 2A:
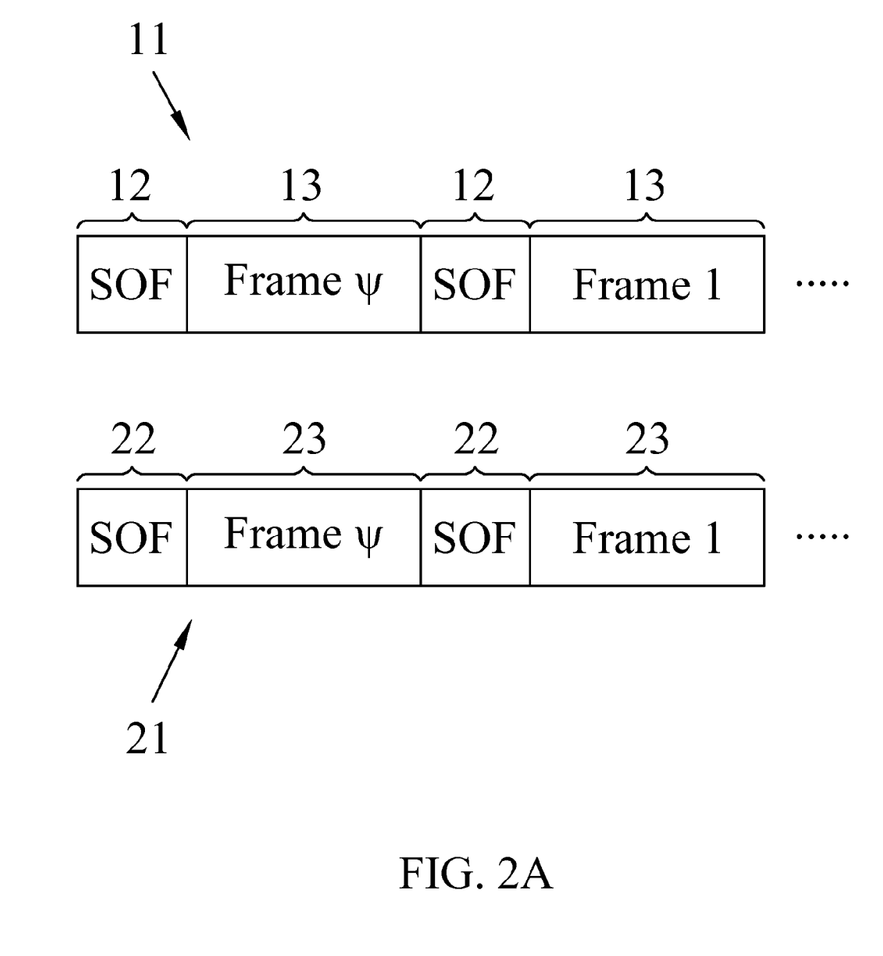
FIG. 2A is the first schematic diagram of an image synchronization system according to the resent invention.

FIG. 2A shows the initial synchronization of the image detection unit 10 and the second image detection unit 20, at this time, the output times of $0^{th}$ first start of frame 12 and $0^{th}$ first image content frame 13 are respectively equal to the output times of $0^{th}$ second start of frame 22 and $0^{th}$ second image content frame 23.

Figure 2B:
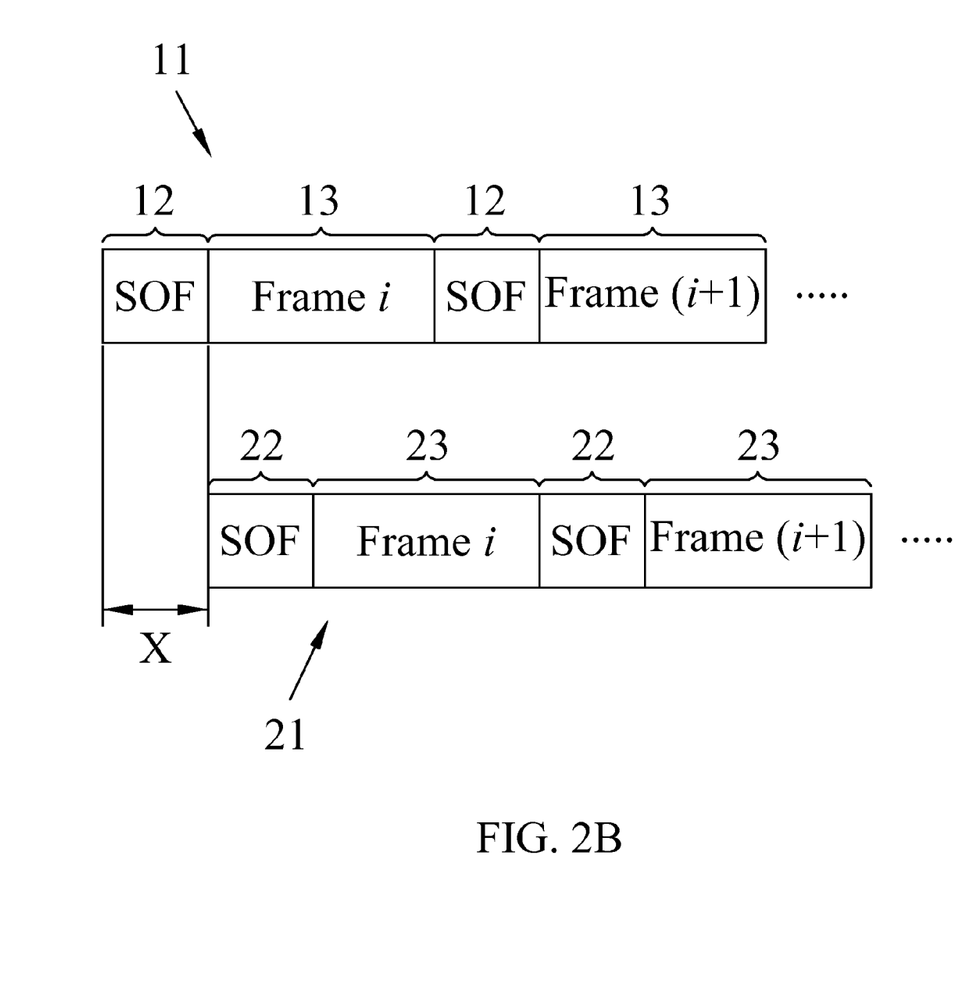
FIG. 2B is the second schematic diagram of an image synchronization system according to the resent invention.

Because the image output speed of the first image detection unit 10 is slightly larger than that of the second image detection unit 20, FIG. 2B shows when passing a period, the monitoring unit (not shown in FIGS.) monitors that $i^{th}$ first start of frame 12 will have an earlier output than that of the $i^{th}$ second start of frame 22 by X millisecond; namely, it reaches the set postponed time threshold 42, this is, the synchronization signal (not shown in FIGS.) is transmitted to the control unit 30 (not shown in FIGS.).

Figure 2C:
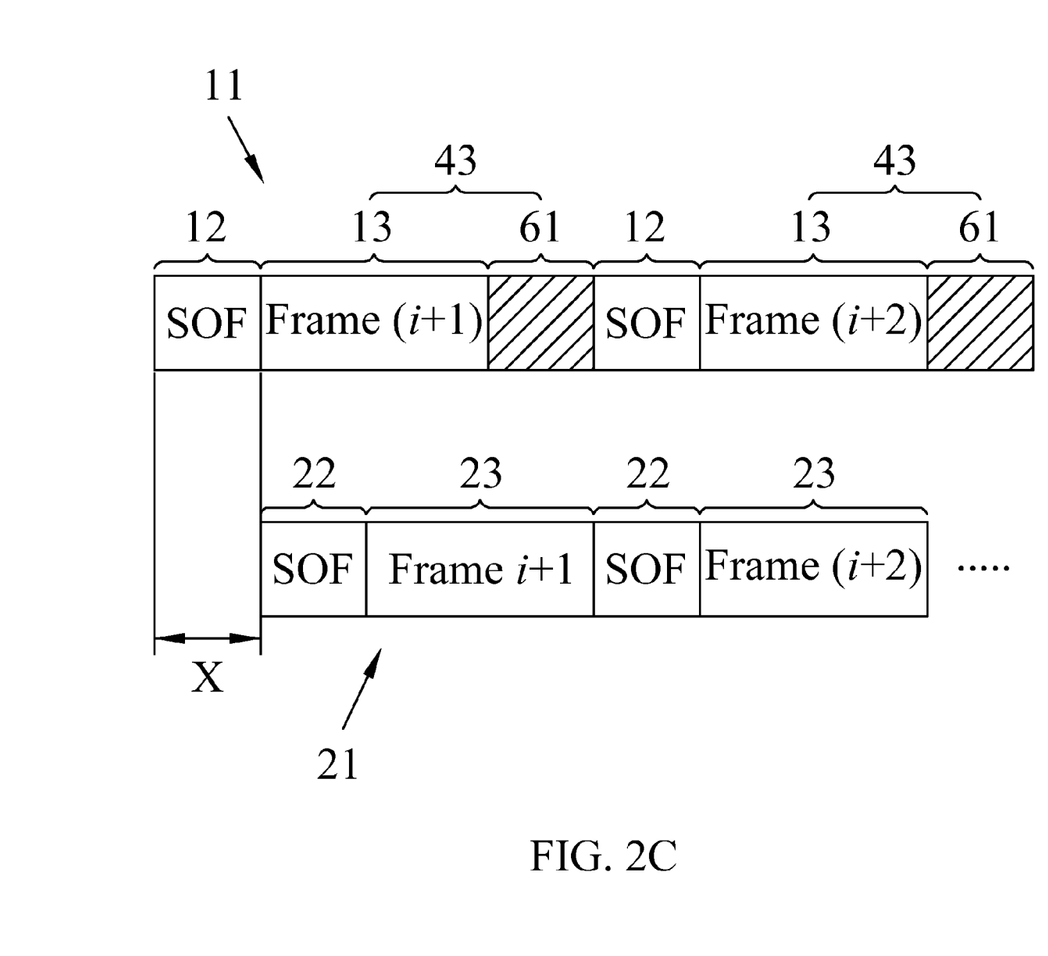
FIG. 2C is the third schematic diagram of an image synchronization system according to the resent invention.

FIG. 2C shows that the control unit (not shown in FIGS.) controls the first image detection unit 10 (not shown in FIGS.) from the $(i+1)^{th}$ first image data 11 adding the extension interval 61 to the first image content frame 13 to form a new first image content extension interval 43, and it can be seen from the FIG that the output time of the first start of frame 12 of the $(i+2)^{th}$ first image data 11 is namely equal to the second start frame 22 of the $(i+2)^{th}$ second image data 21, and when the extension interval 61 is added, the image output speed of the original first image detection unit 10 decreases slightly.

Figure 2D:
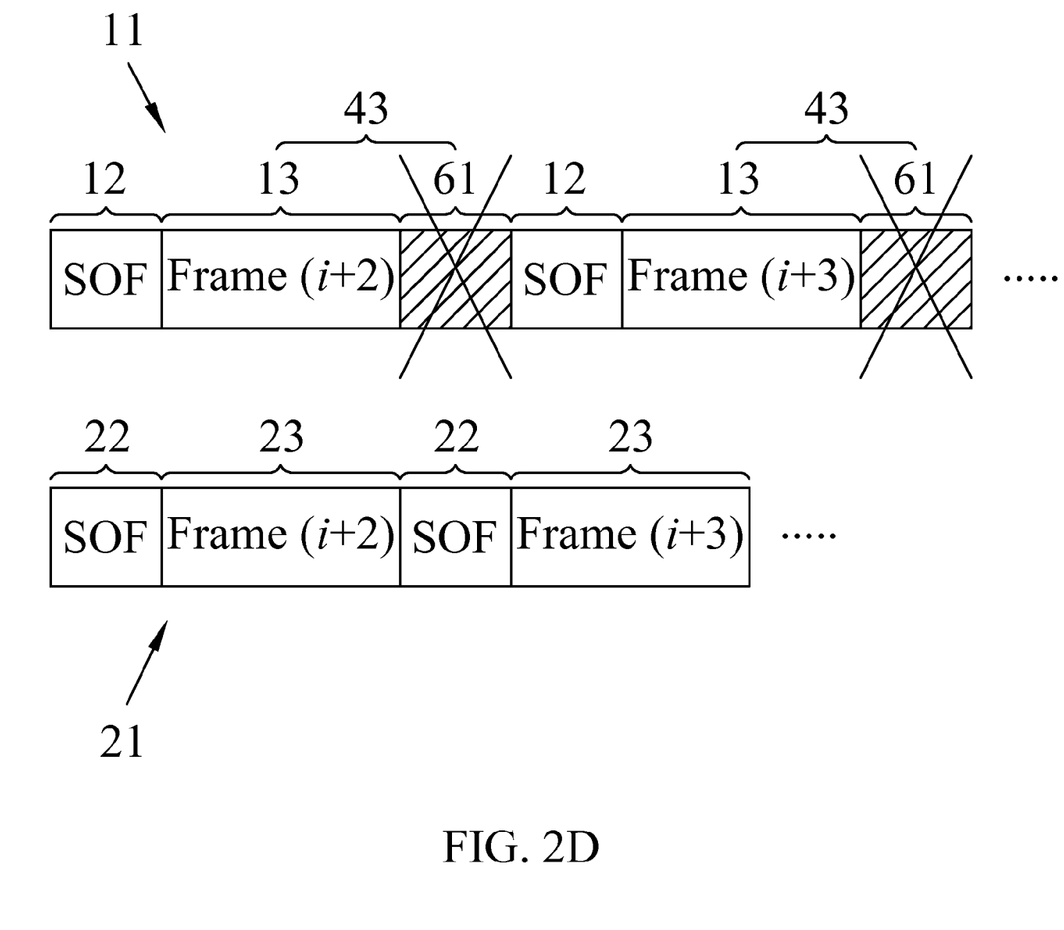
FIG. 2D is the fourth schematic diagram of an image synchronization system according to the resent invention.
Figure 2E:
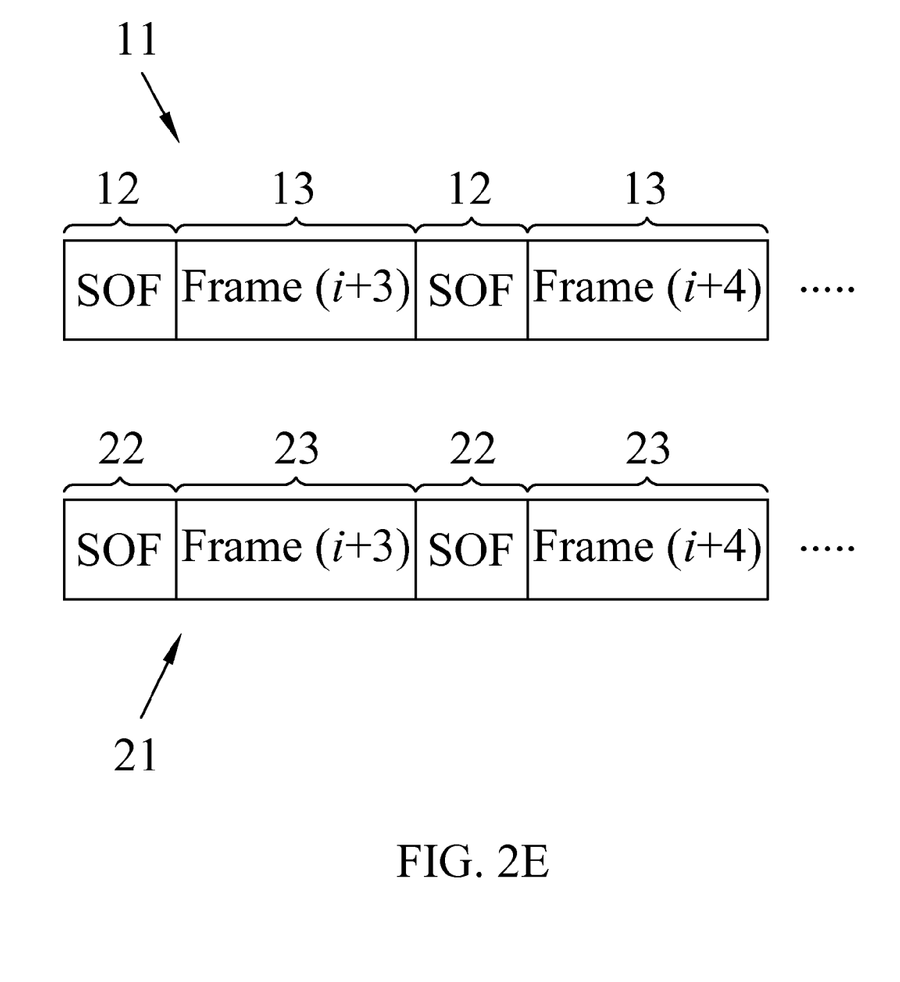
FIG. 2E is the fifth schematic diagram of an image synchronization system according to the resent invention.

FIG. 2D shows that the control unit (not shown in FIGS.) controls the first image detection unit 10 from the $(i+2)^{th}$ first image data 11 to remove the extension interval 61 from the first image content extension interval 43; at this time, the output times of the first start of frame 12 of the $(i+3)^{th}$ first image data 11 and the first image content frame 13 are namely equal to the output times of the second start of frame 22 of the $(i+3)^{th}$ second image data 21 and the second image content frame 23 which is shown in FIG. 2E.

It is noteworthy that the generation of the extension interval 61 is a product of the postponed time threshold 42 and the first image output speed 14, and more preferable, is to set the postponed time threshold 42 as a sum of a cycle of a plurality of scanning lines 63. The reason lies in that the smallest unit consisting of each of the first image data 11 is a pixel, and plural pixels are arranged on the scanning line 63 arranging in a horizontal direction, and then the plurality of scanning lines 63 consist of the first image data 11.

To be specifically, when the cycle of the first image data 11 is 33.3333 milliseconds and the first image data 11 is consisted of 720 scanning lines 63, it can calculate that the cycle of each of the scanning lines 63 is about 1.375 milliseconds (0.001375=33.3333/720); consequently, the postponed time threshold 42 is set as a multiple of the cycle of each of the plurality of scanning lines 63, so that the completed scanning lines 63 are added when the first image detection unit 10 generates the extension interval 61.

Figure 3:
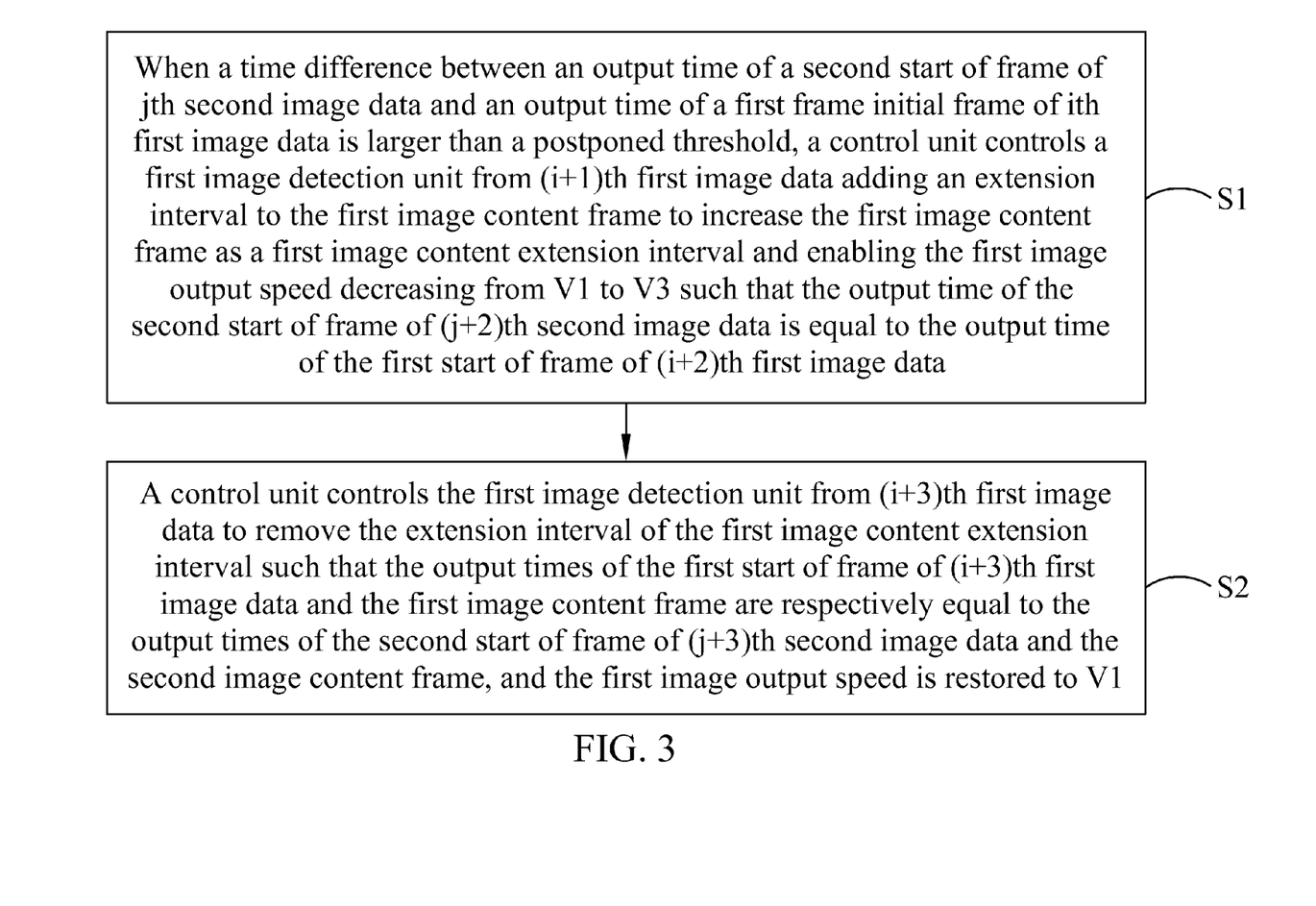
FIG. 3 is a flow chart of steps of an image synchronization method according to the resent invention.

Please refer to FIG. 3 which is a flow chart of steps of an image synchronization method according to the present invention. The image synchronization method is applied to a first image detection unit and a second image detection unit, and the first image detection unit keeps outputting a plurality of first image data, and each of the plurality of first image data includes a first start of frame and a first image content frame; the second image detection unit keeps outputting a plurality of image data, and each of the plurality of second image data includes a second start of frame and a second image content frame, wherein image lengths of the first start of frame and the first image content frame are respectively equal to image lengths of the second start of frame and the second image content frame, a first image output speed V1 of the first image detection unit is higher than a second image output speed V2 of the second image detection unit, and the image synchronization method includes the following steps:

S1: When a time difference between an output time of a second start of frame of $i^{th}$ second image data and an output time of a first frame initial frame of $i^{th}$ first image data is larger than a postponed threshold, a control unit controls a first image detection unit from $(i+1)^{th}$ first image data adding an extension interval to the first image content frame to increase the first image content frame as a first image content extension interval and enabling the first image output speed decreasing from V1 to V3 such that the output time of the second start of frame of $(j+2)^{th}$ second image data is equal to the output time of the first start of frame of $(i+2)^{th}$ first image data. The detailed contents corresponding to the steps are shown in FIG. 2B and FIG. 2C, and the unnecessary details are therefore no longer given here.

S2: A control unit controls the first image detection unit from $(i+3)^{th}$ first image data to remove the extension interval of the first image content extension interval such that the output times of the first start of frame of $(i+3)^{th}$ first image data and the first image content frame are respectively equal to the output times of the second start of frame of $(j+3)^{th}$ second image data and the second image content frame, and the first image output speed is restored to V1. The detailed contents corresponding to the steps are shown in FIG. 2D and FIG. 2E, and the unnecessary details are therefore no longer given here.

Repeatedly executing S1 and S2, the first image detection unit and the second image detection unit can synchronize automatically so as to reach to purpose of synchronizing plural image detection units.

In conclusion, an image synchronization method and system thereof of the present invention are able to effectively synchronize images generated by two image detection units indeed; furthermore, the method is also able to be applied to plural image detection units, and when synchronizing the plural image sensors, the synchronization method can decrease cost of image processing and complication thereof as well.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. An image synchronization method applied to a first image detection unit and a second image detection unit, the first image detection unit keeping outputting a plurality of first image data, and each of the plurality of first image data comprising a first start of frame and a first image content frame; the second image detection unit keeping outputting a plurality of image data, and each of the plurality of second image data comprising a second start of frame and a second image content frame, wherein image lengths of the first start of frame and the first image content frame are respectively equal to image lengths of the second start of frame and the second image content frame, a first image output speed V1 of the first image detection unit is higher than a second image output speed V2 of the second image detection unit, and the image synchronization method comprising:

(a) using a control unit to control the first image detection unit from $(i+1)^{th}$ first image data adding an extension interval to the first image content frame to increase the first image content frame as a first image content extension interval and enabling the first image output speed decreasing from V1 to V3 such that the output time of the second start of frame of $(j+2)^{th}$ second image data is equal to the output time of the first start of frame of $(i+2)^{th}$ first image data when a time difference between an output time of the second start of frame of $j^{th}$ second image data and an output time of the first start of frame of $i^{th}$ first image data is larger than a postponed time threshold; and (b) using the control unit to control the first image detection unit from $(i+3)^{th}$ first image data to remove the extension interval of the first image content extension interval such that the output times of the first start of frame of the $(i+3)^{th}$ first image data and the first image content frame are respectively equal to the output times of the second start of frame of $(j+3)^{th}$ second image data and the second image content frame, and the first image output speed being restored to V1.

2. The image synchronization method of claim 1, wherein size of the extension interval is a product of the time difference and the first image output speed.

3. The image synchronization method of claim 1, wherein the postponed time threshold is equal to a sum of a cycle of a plurality of scanning lines.

4. The image synchronization method of claim 3, wherein the postponed time threshold is equal to a multiple of a cycle of each of the plurality of scanning lines.

5. The image synchronization method of claim 1, wherein the first image detection unit and the second image detection unit are arranged on an electronic device or diverse electronic devices.

6. The image synchronization method of claim 1, wherein the steps of (a) and (b) are executed repeatedly.

7. An image synchronization system applied to a first image detection unit and a second image detection unit, the first image detection unit keeping outputting a plurality of first image data, and each of the plurality of first image data comprising a first start of frame and a first image content frame; the second image detection unit keeping outputting a plurality of second image data, and each of the plurality of second image data comprising a second start of frame and a second image content frame, wherein image lengths of the first start of frame and the first image content frame are respectively equal to image lengths of the second start of frame and the second image content frame, a first image output speed V1 of the first image detection unit is higher than a second image output speed V2 of the second image detection unit, and the image synchronization system comprising:

a monitoring unit adapted to monitor the first image detection unit and the second image detection unit, and when a time difference between an output time of the second start of frame of $j^{th}$ second image data and an output time of the first start of frame of $i^{th}$ first image data being larger than or equal to a postponed time threshold, transmitting a synchronization signal;

an extension interval generation unit adapted to generate an extension interval according to the time difference and the first image output speed; and a control unit adapted to control the extension interval generation unit to generate the extension interval when receiving the synchronization signal, and the control unit from $(i+1)^{th}$ first image data adding an extension interval to the first image content frame to increase the first image content frame as a first image content extension interval and to decrease the first image output speed from V1 to V3 such that the output time of the second start of frame of $(j+2)^{th}$ second image data is equal to the output time of the first start of frame of $(i+2)^{th}$ first image data, and from the first image data, the control unit controlling the first image detection unit to remove the extension interval of the first image content extension interval such that the output times of the first start of frame of the first image data and the first image content frame are respectively equal to the output times of the second start of frame of the second image data and the second image content frame, and the first image output speed being restored to V1.

8. The image synchronization system of claim 7, wherein size of the extension interval is a product of the time difference and the first image output speed.

9. The image synchronization system of claim 7, wherein the postponed time threshold is equal to a sum of a cycle of a plurality of scanning lines.

10. The image synchronization system of claim 7, wherein the first image detection unit and the second image detection unit are arranged on an electronic device or diverse electronic devices.

* * * * *